United States Patent [19]

Marling

[11] 4,362,251

[45] Dec. 7, 1982

[54] SPACE DIVIDING ASSEMBLY

[76] Inventor: Douglas S. Marling, 2511 Elizabeth St., Janesville, Wis. 53545

[21] Appl. No.: 161,598

[22] Filed: Jun. 20, 1980

[51] Int. Cl.³ .......................... B65D 6/24; B65D 25/06
[52] U.S. Cl. .................................... 220/22; 220/22.3; 217/7; 217/65; 217/69
[58] Field of Search ....................... 220/22, 22.1, 22.3, 220/22.2; 52/755; 217/7, 65, 69

[56] References Cited

U.S. PATENT DOCUMENTS

| | | | |
|---|---|---|---|
| 1,893,186 | 1/1932 | Thomas | 217/7 |
| 2,161,107 | 6/1939 | Swingle | 217/69 |
| 3,316,460 | 4/1967 | Scoville | 217/65 |
| 3,759,600 | 9/1973 | MacDonald | 217/65 |
| 4,258,856 | 3/1981 | Marlirz | 217/7 |

Primary Examiner—George E. Lowrance
Attorney, Agent, or Firm—Larson and Taylor

[57] ABSTRACT

A space dividing assembly is provided for dividing a drawer or the like into separate compartments. The basic components of the assembly are generally flat rectangular partition members having at least one pair of longitudinal dadoes or grooves formed in the major oppositely facing surfaces which are partially covered by rails to form channels and connector members which interconnect the partition members. The connector members include two perpendicularly extending flanges which are received in the channels between the rails and dadoes of the partition members. The space dividing assembly further includes a four sided storage box or the like having longitudinal dadoes or grooves formed in the major inner surfaces that are partially covered by rails to form channels and can be divided into separate compartments by appropriately sized partition and connector members.

9 Claims, 7 Drawing Figures

SPACE DIVIDING ASSEMBLY

FIELD OF THE INVENTION

The invention relates to a space dividing arrangement for dividing the space within existing drawers into separate compartments as well as in forming storage boxes or the like.

BACKGROUND OF THE INVENTION

A number of arrangements are known for dividing an existing space into separate compartments so that, for example, different items can be stored separately. Flanged connecting members having interfitting partitions of various kinds have been used for this purpose and examples of such arrangements are disclosed in U.S. Pat. Nos. 1,620,737 (Petersen); 2,549,509 (Monroe); 3,913,289 (Recker); and 1,863,381 (Orthwine). Other patents of possible interest which show other types of interfitting partitions are disclosed in U.S. Pat. Nos. 943,817 (Vick); 2,743,774 (Pinto); 2,614,715 (Ross); 2,082,667 (Vanderveld); 3,227,504 (Dunham); 3,746,181 (Benoit); 855,814 (Rote); 261,919 (Gibbons); 1,048,566 (Miller); 4,118,903 (Coulthard); 3,702,520 (Huber et al); 3,225,952 (Stiles); 2,825,614 (Card); 2,343,936 (Showers Sr.); 3,140,791 (Reiss, Sr. et al); 3,680,177 (Ginsberg); 960,934 (Hunter); and 397,012 (Lyons). Foreign patents of possible interest include French Pat. Nos. 995,907 and 2,308,820.

Although divider arrangements of the prior art basically serve the purpose for which they are intended, these arrangements offer disadvantages particularly regarding ease of assembly, versatility in providing different compartment shapes and patterns, and flexibility in use.

SUMMARY OF THE INVENTION

In accordance with the invention, a space dividing assembly is provided which overcomes the disadvantages discussed above. The assembly is extremely versatile and flexible in use, permitting what is for all practical purposes an infinite number of compartment shapes and patterns while employing only a relatively few components.

In a preferred embodiment of the invention, the space dividing assembly is comprised of a plurality of partition members and a plurality of connector members. The partition members are flat, generally rectangular shaped, and include at least one pair of longitudinal dadoes or grooves formed in the major oppositely facing surfaces and extending along the longitudinal length of the partition member. Covering a portion of each dado along the longitudinal length thereof is a flexible rail which forms a channel. The connector members include a pair of generally planar flanges which are orthogonally joined to each other along adjacent sides. Juxtaposed partition members are connected to each other by inserting the flanges of the connector member into adjacent channels of the partition members.

In a further embodiment, the assembly includes a storage box or the like having a bottom and four upright sides. Each of the major inner surfaces of the sides have at least one longitudinal dado and rail extending from one adjacent side to the other. This box is conveniently divided into separated compartments by appropriately sized partition and connector members.

Other features and advantages of the invention are set forth in, or are apparent from, the detailed description of preferred embodiments found hereinbelow.

DETAILED DESCRIPTION OF THE PREFERRED EMBODIMENTS

Figure 1:
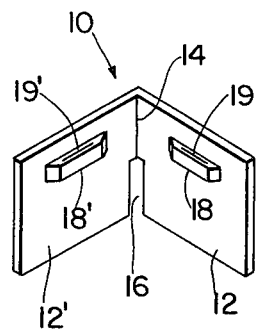
FIG. 1 is a perspective view of a connector member in accordance with the invention.

Referring to FIG. 1, a perspective view is provided of a basic connector member 10 which is used in constructing the space dividing assembly of the invention. As illustrated, connector member 10 includes two flanges 12 and 12' which are orthogonally joined to each other along adjacent sides at joint 14. An opening 16 is provided between the two flanges 12 and 12'. Flanges 12 and 12' are generally planar and rectangularly shaped, except where handles 18 and 18' project from the respective adjacent surfaces. Slots 19 and 19' are provided respectively between handle 18 and flange 12 and handle 18' and flange 12'.

Figure 2:
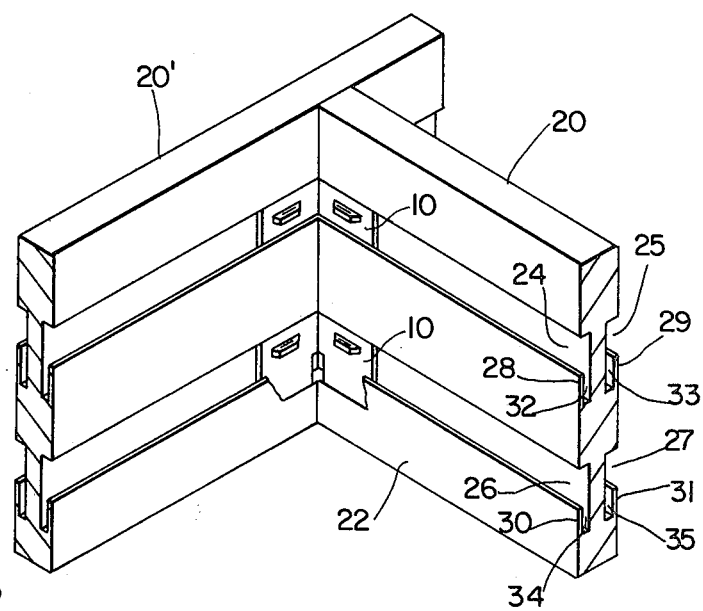
FIG. 2 is a perspective view of two partition members connected by two connector members shown in FIG. 1.

Referring now to FIG. 2, two partition members 20 and 20' are depicted as they are connected together by two connector members 10. As both partition members 20 and 20' are structurally identical, only partition member 20 will be described. Partition member 20 consists of a generally rectangular body 22 with corresponding pairs of dadoes or grooves 24, 25 and 26, 27 formed longitudinally along the length of body 22 in the major oppositely facing surfaces. Projecting upward from body 22 are rails 28, 29, 30 and 31 which partially cover dadoes 24, 25, 26 and 27 respectively, along the longitudinal length of these dadoes. These rails are relatively thin so that they are somewhat flexible. The space between rails 28 to 31 and body 22 forms channels 32, 33, 34 and 35 in dadoes 24 to 27.

As shown in FIG. 2, the height flanges 12 and 12' of connector member 10 corresponds to the height of the dadoes in partition member 20. In addition, the thickness of flanges 12 and 12' of connector member 10 correspond to the thickness of channels 32 to 35 of partition member 20. Space 16 of connector member 10 has a height which corresponds to the height of the rails of partition member 20. With this design, when connector member 10 is inserted into a dado and channel of partition member 20, it is then frictionally retained.

In order to connect partition members 20 and 20' together, connector member 10 must be located in juxtaposed dadoes of the two partition members. The positioning of connector member 10 can be achieved by a number of methods. In a first method, flange 12' of connector member 10 is inserted into the end of a dado and channel in partition member 20'. Connector member 10 is then moved along the dado and channel until it is positioned at the appropriate place. Next, the end of the corresponding dado and channel of partition member 20 is pushed onto flange 12 of connector member 10 which projects away from partition member 20'. In another method, connector member 10 can be positioned at an appropriate place along partition member 20' by merely pushing flange 12' into the dado and channel behind the flexible rail until connector member 10 snaps in place. Once in place, the other partition member 20 can be pushed onto flange 12 projecting away from partition member 20'. In still another method, partition members 20 and 20' are placed together at right angles and flanges 12 and 12' are inserted into the adjacent dadoes and channels simultaneously until connector member 10 snaps in place in both dadoes and channels. By reversing the steps of these methods, partition members 20 and 20' are disconnected.

Figure 3:
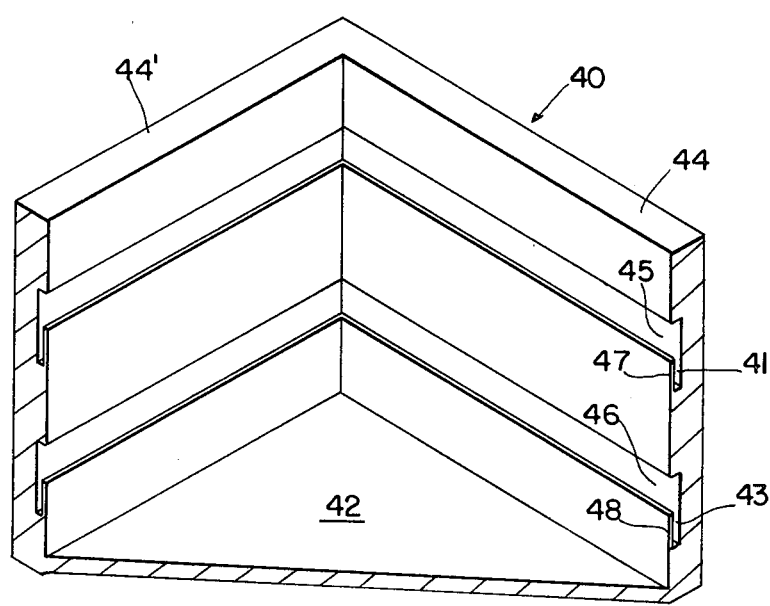
FIG. 3 is a perspective view of a portion of a storage box in accordance with the invention.

Depicted in FIG. 3 is a corner portion of a storage box 40 or the like which can be conveniently divided into a number of compartments by partition members 20 and connector members 10 and inserted into an existing drawer if desired. The portions of storage box 40 shown are a bottom 42 and side walls 44 and 44'. As side walls 44 and 44' are structurally identical, only side wall 44 will be described. The structure of side wall 44 is similar to the structure of partition member 20, except that only the major inner surface of side wall 44 contains dadoes 45 and 46. Dadoes 45 and 46 are covered partially by rails 47 and 48 respectively, forming channels 41 and 43, respectively. Appropriately sized partition members 20 are thus connectable to side wall 44 by use of connector members 10.

Where connector members 10 are snapped into place by pushing flange 12 behind a flexible rail into a channel, handles 18 and 18' are conveniently used to push against. Similarly, if it is desired to remove connector member 10 from a channel handles 18 and 18' are also conveniently used to grasp and pull connector member 10 from the channel behind the flexible rail. The use of handles 18 and 18' are of particular utility when a connector member 10 is simultaneously inserted into adjacent dadoes of partition members 20 and 20'.

Figure 4:
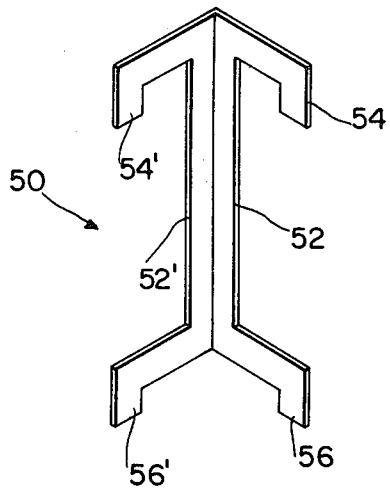
FIG. 4 is a perspective view of a tool which is utilized to install and remove connector members shown in FIG. 1.

Depicted in FIG. 4 is a tool 50 which further facilitates the insertion and removal of connector member 10 with regard to partition members 20 and 20'. Tool 50 is composed of two identical "C" sections 52 and 52' having depending pairs of prongs 54, 54' and 56, 56'. Sections 52 and 52' are orthogonally joined along adjacent sides. Prongs 54, 54' and 56, 56' are sized so as to be frictionally retained when inserted into slots 19 and 19' of connector member 10. When it is desired to insert connector member 10 into the corresponding dadoes of two juxtaposed partition members 20 and 20', prongs 56 and 56' are inserted downwardly into corresponding slots 19 and 19' of connector member 10. Next, both flanges 12 and 12' are positioned in the corresponding dadoes of the two juxtaposed partition members 20 and 20'. By pushing on tool 50, connector member 10 is then pushed until it snaps into place in the corresponding channels of the dadoes of partition members 20 and 20'. When it is desired to remove connector 10 from the two juxtaposed partition members 20 and 20', tool 50 is inverted and prongs 54 and 54' are inserted upward into slots 19 and 19'. By pulling away from the partition members and upwards on tool 50 connector member 10 will be pulled from the dadoes and channels of the partition members 20 and 20'. Besides removing connector member 10 from the two channels simultaneously, tool 50 may be used to insert or remove a connector member 10 from a single partition member as well.

Figure 5:
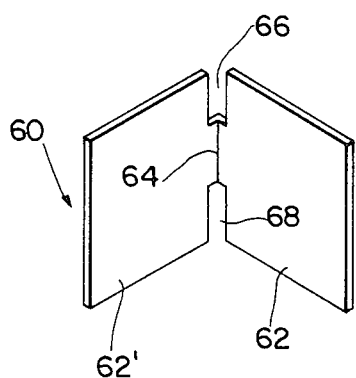
FIG. 5 is a perspective view of a second embodiment of a connector member in accordance with the invention.

An alternative embodiment of a connector member 10 is depicted in FIG. 5. Connector member 60 is similar to connector member 10 in that it is formed from two generally planar flanges 62 and 62' which are orthogonally joined to each other along adjacent sides at joint 64. Located above and below joint 64 are openings 66 and 68, respectively.

Figure 6:
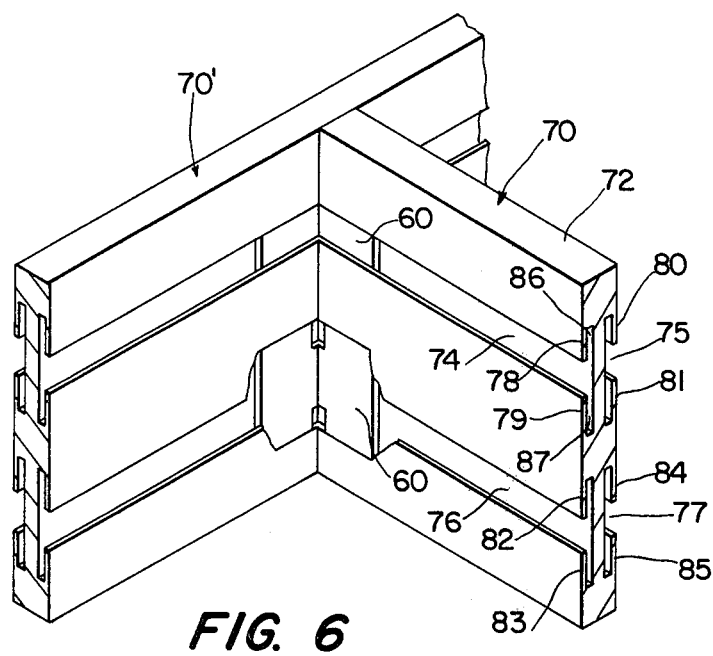
FIG. 6 is a perspective view of a second embodiment of two partition members which are connected by two connector members depicted in FIG. 5.

Referring to FIG. 6, two alternative partition members 70 and 70' are disclosed which are connected together by two connector members 60. Both partition members 70 and 70' are structurally identical, so that only partition member 70 will be described in detail. Partition member 70 is comprised of a body 72 having two pairs of correspondingly located dadoes 74, 75 and 76, 77. Each dado 74 to 77 is partially covered along its longitudinal length at the top and bottom by pairs of rails 78 and 79, 80 and 81, 82 and 83, and 84 and 85, respectively. This forms two channels in each dado, such as channels 86 and 87 identified in dado 74. In the same manner as with connector member 10 and partition members 20 and 20', the dadoes and channels of partition member 70 are sized to frictionally retain flanges 62 or 62' of connector member 60. In addition, openings 66 and 68 are also sized so that the rails of partition member 70 pass through these openings.

As shown in FIG. 6, partition members 70 and 70' may be orthogonally connected to each other using two connector members 60. To connect partition members 70 and 70', flange 62' of each connector member 60 is inserted into the corresponding dado and channels of partition member 70'. Next, partition member 70 is connected to partition member 70' by inserting flange 62 of each connector member 60 into the appropriate dado and channels of partition member 70. Disconnection is accomplished in the reverse order.

Figure 7:
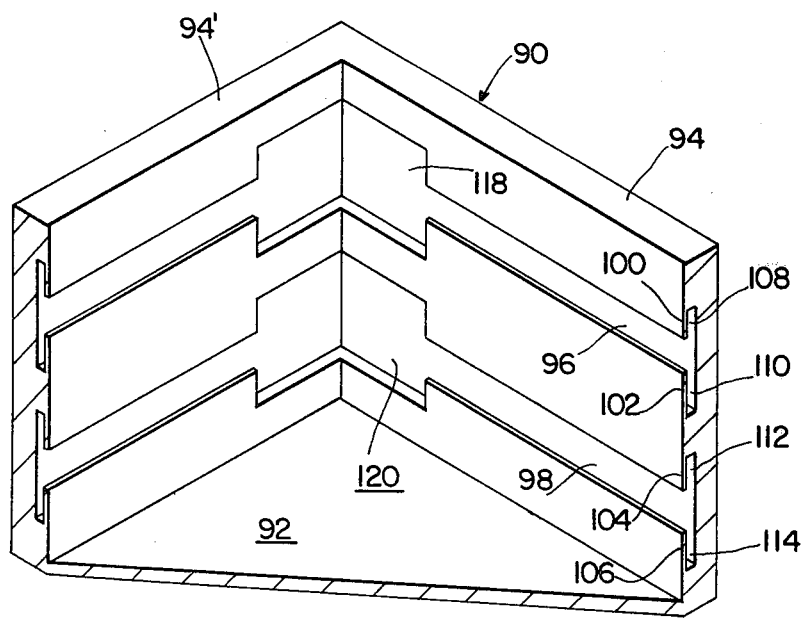
FIG. 7 is a perspective view of a portion of a storage box in accordance with the second embodiment of the invention.

A alternative storage box 90 which is divided into a number of separate compartments by using connector members 60 and partition members 70 is partially depicted in FIG. 7. The portions of storage box 90 depicted are a bottom 92 and sides walls 94 and 94'. As side walls 94 and 94' are structurally the same, only side wall 94 will be described in detail. Side wall 94 is similar to partition member 70 and has two dadoes 96 and 98 along the longitudinal length thereof. Partially covering the top and bottom of each dado 96 and 98 are rails 100, 102 and 104, 106 respectively, forming channels 108, 110, 112 and 114 respectively. Rails 100 to 106 extend along the longitudinal length of dadoes 96 and 98, except for an open portion 118, 120 at the intersection of side walls 94 and 94'. Open portions 118 and 120 are sized to receive flange 62 of connector member 60 so that flange 62 can be inserted into the dado and channels. Using appropriately sized partition members 70 and connector members 60, storage box 90 can be divided into a plurality of different sized compartments.

Although the invention has been described relative to examplary embodiments thereof, it will be understood that other variations and modifications can be effected in these embodiments without departing from the scope and spirit of the invention.

I claim:

1. A space dividing assembly for dividing a space so as to define a plurality of separate compartments or the like, said assembly comprising:

a plurality of partition members of flat, generally rectangular shape and including at least one longitudinal groove formed in each of the major oppositely facing surfaces of said partition member and extending from one end of said surfaces to the other, said partition members further including flexible first rails which extend substantially parallel to the major surfaces of the partition member from parts of the partition member which define one side wall of said grooves so as to cover a portion of said grooves over the length of said grooves and to thereby form channels therewith; and a plurality of connector members for connecting said partition members together to form the space dividing assembly, each of said connector members including a pair of generally planar, orthogonally extending flanges joined to each other along adjacent sides, each of said flanges engaging in a respective channel of juxtaposed, orthogonally disposed ones of said partition members so as to connect said juxtaposed partition members together, the planes of the flanges of the connector members extending parallel to the rails of the channels in which the flanges are engaged and each connector member being of such a size and shape so as to lie substantially entirely within the channels of the partition members connected together thereby.

2. A space dividing assembly as claimed in claim 1 wherein each said flange of said connector member is generally rectangular in shape and adjacent sides of said flanges are joined along that portion corresponding to the portion of said first groove not covered by said first rails when said connector member is inserted in said groove so that an opening is left between said joined pair of flanges in which said rails of said partition members extend when said connector member is inserted into said partition members.

3. A space dividing assembly as claimed in claim 1 or 2 wherein said partition members further include second rails which partially cover an opposite portion of said grooves along the longitudinal length of said grooves, leaving a portion of said grooves between said first and second rails uncovered, said connector members also being joined only along that portion of said groove not covered by said second rail as well.

4. A space dividing assembly as claimed in claim 2 wherein each said connector member further includes a protruding handle located on each said flange.

5. A space dividing assembly as claimed in claim 4 wherein said handle contains a slot therethrough running parallel with the joined sides of said flanges so that a tool with correspondingly shaped portions is inserted into said slots to facilitate the insertion and removal of said connector members from said partition members.

6. A space dividing assembly as claimed in claim 1 wherein said assembly is disposed in an existing drawer.

7. A space dividing assembly as claimed in claim 1 wherein said assembly includes a box having a bottom and four upright sides, each of the inner surfaces of said sides having at least one longitudinal groove extending from one adjacent side to the other adjacent side, each said inner surface also having a first rail covering a portion of said groove to form a channel over the longitudinal length of said groove such that said box is divided into separate compartments by said partition members and by said connectors.

8. A space dividing assembly as claimed in claim 7 wherein each said box side further includes a second rail which partially covers an opposite portion of each said groove along the longitudinal length of said groove leaving a portion of said groove between said first and second rails uncovered, said first and second rails ending at a distance away from an adjacent side at least as great as the width of said flange of said corresponding connecting member.

9. A space dividing assembly as claimed in claim 7 wherein said partition members have two pairs of longitudinal grooves formed in each side and each inner surface of said box sides have two correspondingly located longitudinal grooves.

* * * * *